(12) United States Patent
Mun et al.

(10) Patent No.: US 12,711,054 B2
(45) **Date of Patent: *Aug. 18, 2026**

(54) MEMORY DEVICE FOR OUTPUTTING DATA AND OPERATING METHOD THEREOF

(71) Applicant: SK hynix Inc., Icheon-si (KR)

(72) Inventors: Ji Seong Mun, Icheon-si (KR); Chan Keun Kwon, Icheon-si (KR); Young Seung Yoo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,774

(22) Filed: Jul. 8, 2024

(65) Prior Publication Data

US 2025/0272224 A1 Aug. 28, 2025

(30) Foreign Application Priority Data

Feb. 22, 2024 (KR) ........................ 10-2024-0025909

(51) Int. Cl.
*G06F 12/02* (2006.01)

(52) U.S. Cl.
CPC .................................. *G06F 12/023* (2013.01)

(58) Field of Classification Search
CPC .................................................... G06F 12/023
See application file for complete search history.

(56) References Cited

U.S. PATENT DOCUMENTS

2006/0090108 A1* 4/2006 Seyyedy ................ G11C 29/40 714/718
2010/0110802 A1 5/2010 Momma
2013/0009065 A1 1/2013 Okada
2013/0201769 A1* 8/2013 Yang ...................... G11C 16/32 365/189.011
2013/0315007 A1* 11/2013 Cha ........................ G11C 29/40 365/189.07

(Continued)

FOREIGN PATENT DOCUMENTS

KR 1020080022628 A 3/2008
KR 1020080046345 A 5/2008

(Continued)

*Primary Examiner* — Kaushikkumar M Patel
*Assistant Examiner* — Christian Joseph O'Connell
(74) *Attorney, Agent, or Firm* — WILLIAM PARK AND ASSOCIATES LTD.

(57) ABSTRACT

A semiconductor device includes at least two planes including a plurality of memory bank groups, each of the plurality of memory bank groups including a plurality of memory banks, a plurality of compressing circuits, each coupled to at least two memory banks, the at least two memory banks being included in the same plane, each of the plurality of compressing circuits compressing a plurality of data read from the at least two memory banks to output compressed data, at least one merge circuit receiving a plurality of compressed data from at least two compressing circuits and merging the plurality of compressed data to output merged data, and an output buffer circuit receiving a plurality of merged data and outputting the plurality of merged data to an external device, wherein each memory bank, among the at least two memory banks, is included in different memory bank groups.

19 Claims, 9 Drawing Sheets

(56) References Cited

U.S. PATENT DOCUMENTS

| | | | | |
|---|---|---|---|---|
| 2014/0133235 | A1* | 5/2014 | Kim | G11C 8/08 365/185.12 |
| 2014/0301149 | A1 | 10/2014 | Hsu | |
| 2021/0117335 | A1* | 4/2021 | Kondo | G11C 16/0483 |
| 2022/0343993 | A1 | 10/2022 | Gadamsetty | |
| 2023/0081623 | A1 | 3/2023 | Hsu et al. | |
| 2025/0054526 | A1* | 2/2025 | Kwon | G11C 7/1069 |
| 2025/0077425 | A1* | 3/2025 | Mun | G11C 7/1006 |

FOREIGN PATENT DOCUMENTS

| | | | | | |
|---|---|---|---|---|---|
| KR | 1020090047975 | A | | 5/2009 | |
| KR | 20110002678 | A | * | 1/2011 | G11C 29/48 |
| KR | 1020120098094 | A | | 9/2012 | |
| KR | 1020160143014 | A | | 12/2016 | |
| KR | 1020210092302 | A | | 7/2021 | |

* cited by examiner

Figure 3B:
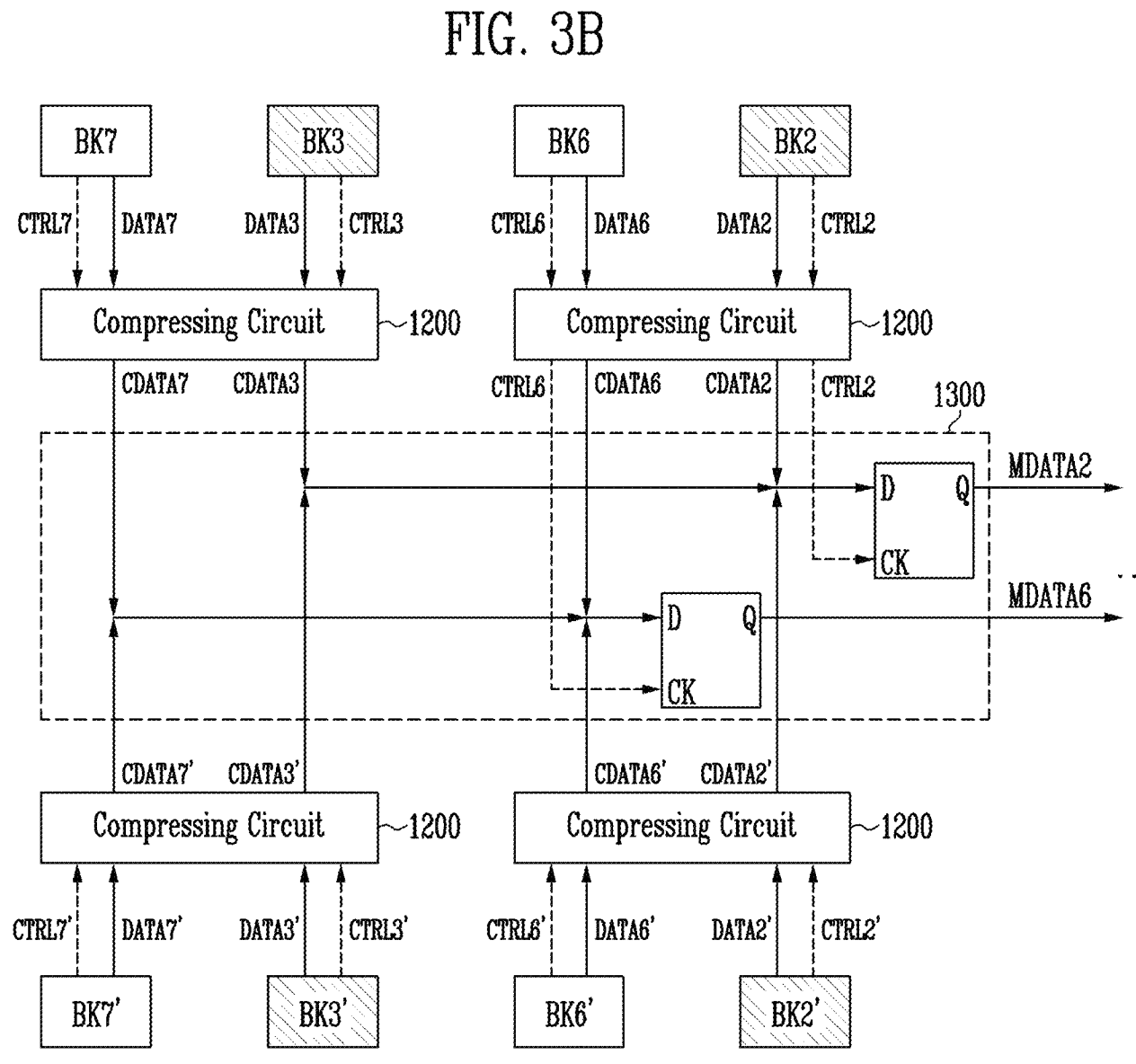

BK7 BK3 BK6 BK2
CTRL7 DATA7 DATA3 CTRL3 CTRL6 DATA6 DATA2 CTRL2
Compressing Circuit 1200
CDATA7 CDATA3 CTRL6 CDATA6 CDATA2 CTRL2
1300
D Q CK
MDATA2 MDATA6
CDATA7' CDATA3' CDATA6' CDATA2'
Compressing Circuit 1200
CTRL7' DATA7' DATA3' CTRL3' CTRL6' DATA6' DATA2' CTRL2'
BK7' BK3' BK6' BK2'

FIG. 5

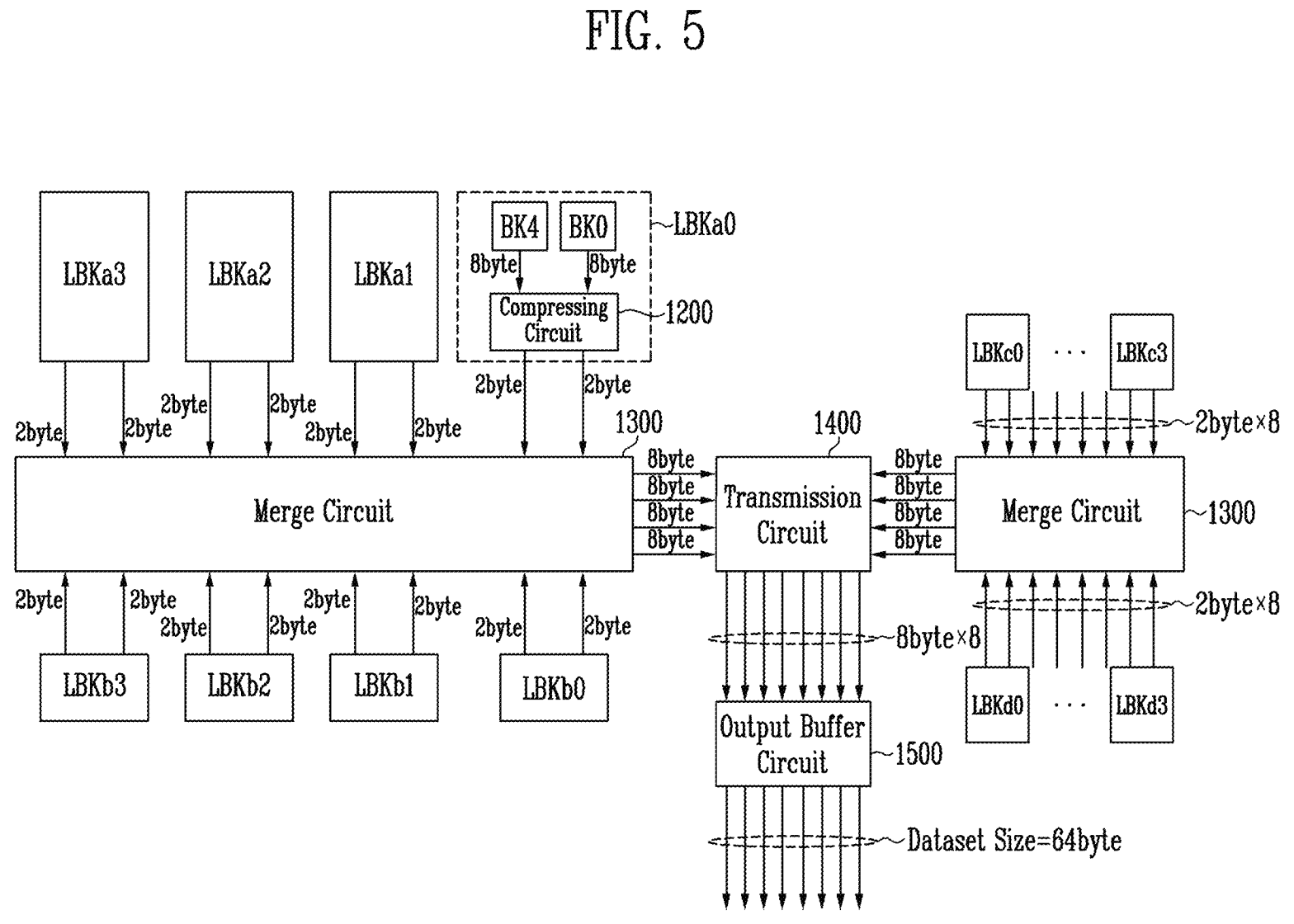

LBKa0
BK0
BK4
8byte
8byte
Compressing Circuit
1200
2byte
2byte
LBKa1
LBKa2
LBKa3
1300
Merge Circuit
LBKb0
LBKb1
LBKb2
LBKb3
8byte
8byte
8byte
8byte
1400
Transmission Circuit
8byte×8
1500
Output Buffer Circuit
Dataset Size=64byte
LBKc0
LBKc3
Merge Circuit
1300
2byte×8
LBKd0
LBKd3
2byte×8

MEMORY DEVICE FOR OUTPUTTING DATA AND OPERATING METHOD THEREOF

CROSS-REFERENCE TO RELATED APPLICATION

The present application claims priority under 35 U.S.C. § 119 (a) to Korean patent application number 10-2024-0025909 filed on Feb. 22, 2024, in the Korean Intellectual Property Office, the entire disclosure of which application is incorporated by reference herein.

BACKGROUND

1. Technical Field

The present disclosure relates to a semiconductor device, and more particularly, to a memory device outputting read data to an external device and an operating method thereof.

2. Related Art

Data which is read in a memory device may be transferred to input/output pads through data lines. The number of data lines may be fixed to a predetermined number due to physical limitations. Generally, a plurality of memory areas (memory banks) that are included in one memory device or a plurality of memory devices may share a predetermined number of data lines.

In general, an operation of sharing and using data lines may refer to an operation in which a plurality of memory areas included in one or a plurality of memory devices exclusively use a predetermined number of data lines during a predetermined time in predetermined order through time division.

However, in a predetermined operation mode, such as a compression read operation, data that is read from each of the plurality of memory areas included in one or a plurality of memory devices may be compressed and output, and the plurality of memory areas included in the one memory device or the plurality of memory devices may use a predetermined number of data lines by grouping the data lines in predetermined numbers. Therefore, the plurality of memory areas may be used at the same time.

The size of the data that are output from the memory areas may increase as the number of memory areas increases. As a result, the number of circuits for compressing data may be increased to result in the increased size of the memory device. Moreover, a device that receives compressed data may have to change the existing method of decoding compressed data to a new decoding method for the size of the output data.

SUMMARY

A memory device may include at least two planes including a plurality of memory bank groups, wherein each of the plurality of memory bank groups includes a plurality of memory banks, a plurality of compressing circuits each coupled to at least two memory banks, among the plurality of memory banks, the at least two memory banks being included in the same plane, among the at least two planes, wherein each of the plurality of compressing circuits is configured to compress a plurality of data read from the at least two memory banks to output compressed data respectively corresponding to the at least two memory banks, at least one merge circuit configured to receive a plurality of compressed data corresponding to a plurality of memory banks included in one memory bank group, among the plurality of memory bank groups, from at least two compressing circuits, among the plurality of compressing circuits, and configured to merge the plurality of compressed data to output merged data corresponding to the one memory bank group, and an output buffer circuit configured to receive a plurality of merged data corresponding to the plurality of memory bank groups from the at least one merge circuit, and configured to output the plurality of merged data to an external device, wherein each memory bank, among the at least two memory banks coupled to a corresponding compressing circuit, is included in different memory bank groups among the plurality of memory bank groups.

A method of operating a memory device including a plurality of planes each including a plurality of memory banks may include grouping the plurality of memory banks into a plurality of memory bank groups, reading a plurality of data from a plurality of memory banks included in the plurality of memory bank groups, compressing the plurality of data, wherein a plurality of data read from at least two memory banks, among the plurality of memory banks, included in one of the plurality of planes are simultaneously compressed, merging a plurality of compressed data corresponding to a plurality of memory banks included in one memory bank group among the plurality of memory bank groups, and outputting a plurality of merged data corresponding to the plurality of memory bank groups to an external device, wherein each memory bank, among the at least two memory banks, is included in different memory bank groups among the plurality of memory bank groups.

A memory device may include a plurality of planes including a plurality of banks, a first compressing circuit coupled to a first memory bank and a second memory bank, among the plurality of memory banks, wherein the first compressing circuit is configured to compress first data read from the first memory bank and second data read from the second memory bank to output first compressed data and second compressed data corresponding to the first memory bank and the second memory bank, respectively, a second compressing circuit coupled to a third memory bank and a fourth memory bank, among the plurality of memory banks, wherein the second compressing circuit is configured to compress third data read from the third memory bank and fourth data read from the fourth memory bank to output third compressed data and fourth compressed data corresponding to the third memory bank and the fourth memory bank, respectively; a first merge circuit configured to generate first merged data by merging the first compressed data and third compressed data, a second merge circuit configured to generate second merged data by merging the second compressed data and fourth compressed data, and an output buffer circuit configured to output the first merged data and the second merged data to an external device according to a predetermined order.

BRIEF DESCRIPTION OF THE DRAWINGS

FIG. 1 is a diagram illustrating a memory device according to an embodiment of the present disclosure;

FIGS. 3A and 3B are diagrams illustrating a merging circuit according to an embodiment of the present disclosure;

FIG. 5 is a diagram illustrating a size of a data set that is output from a memory device according to an embodiment of the present disclosure;

DETAILED DESCRIPTION

Figure 2:
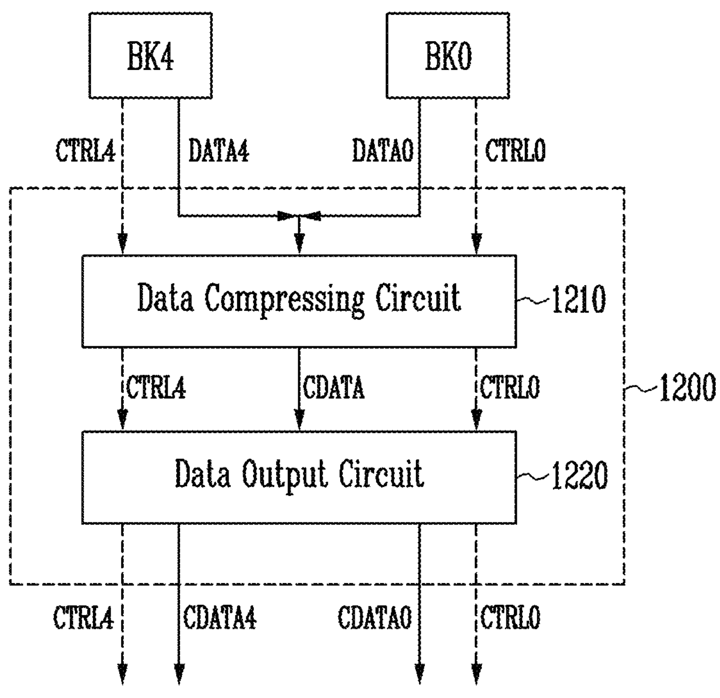
FIG. 2 is a diagram illustrating a compressing circuit according to an embodiment of the present disclosure.

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Embodiments of the present disclosure provide a memory device capable of improving the performance of a compression read operation and a method of operating the same.

Figure 1:
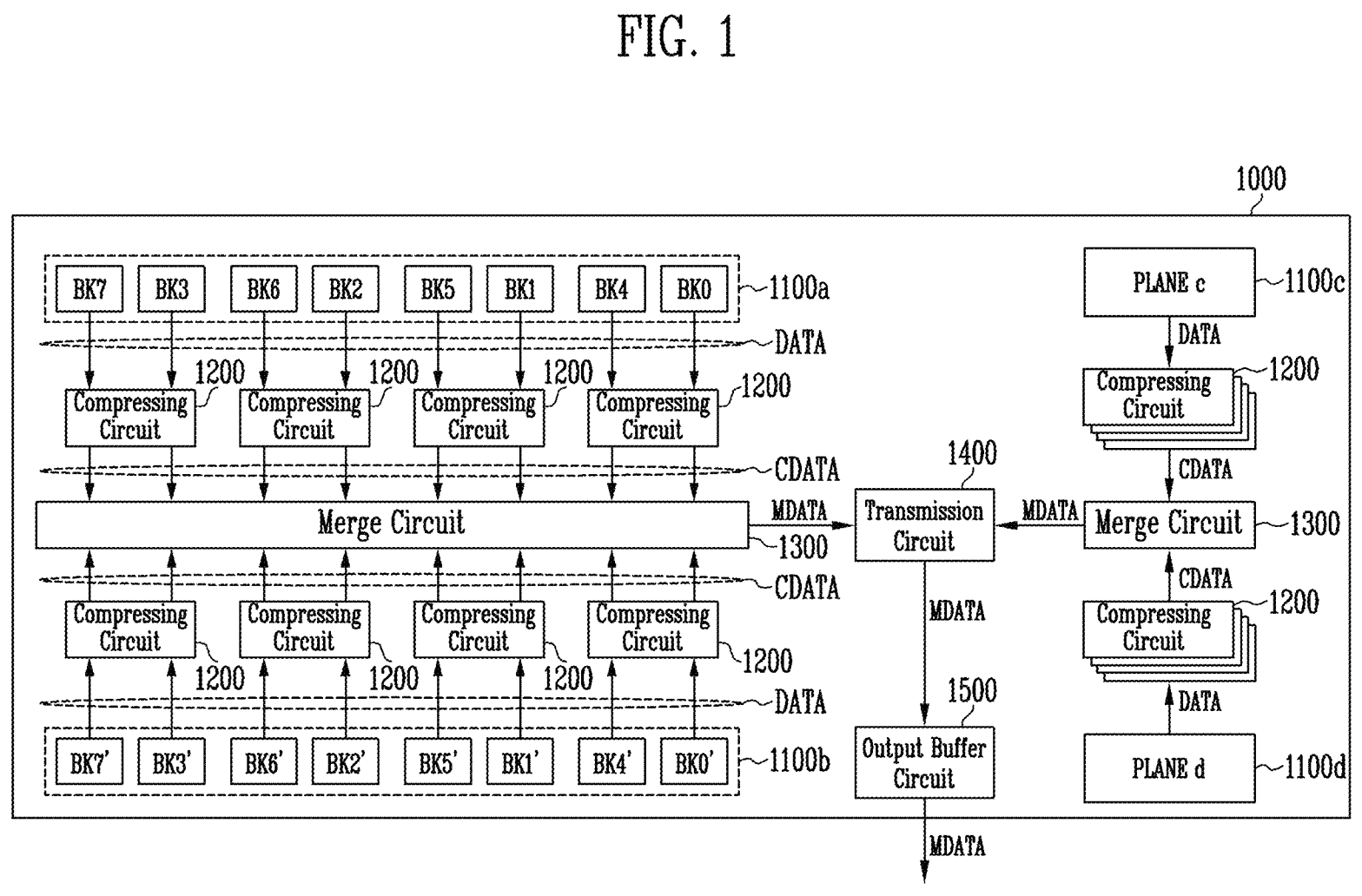

FIG. 1 is a diagram illustrating a memory device 1000 according to an embodiment of the present disclosure.

Referring to FIG. 1, the memory device 1000 may include a plurality of planes 1100*a* to 1100*d*, a plurality of compressing circuits 1200, a plurality of merge circuits 1300, a transmission circuit 1400, and an output buffer circuit 1500.

Each of the plurality of planes 1100*a* to 1100*d* may include a plurality of memory banks. FIG. 1 illustrates a plurality of memory banks BK0 to BK7 included in a plane a 1100*a* and a plurality of memory banks BK0' to BK7' included in a plane b 1100*b*. However, a plane c 1100*c* and a plane d 1100*d* may also include the same number of memory banks. In addition, although each plane is shown to have eight memory banks, the number of memory banks included in each plane is not limited thereto. For example, each of the planes may include two or more memory banks, and each of the planes may include more or less than the eight memory banks that are shown in FIG. 1. For example, each plane may include 16 or 32 memory banks.

The plurality of planes 1100*a* to 1100*d* may be grouped into one or more plane groups that share a peripheral circuit. For example, the plane a 1100*a* and the plane b 1100*b* may share a peripheral circuit and may be grouped into one plane group. In addition, the plane c 1100*c* and the plane d 1100*d* may share a peripheral circuit and may be grouped into another plane group. Hereinafter, for convenience of explanation, the structure, operations, and the relationship with other components, such as the compressing circuit 1200, the merge circuit 1300, the transmission circuit 1400, and the output buffer circuit 1500 in each plane, will be described based on the plane a 1100*a* and the plane b 1100*b*. However, the following description is applicable to the plane c 1100*c* and the plane d 1100*d*.

Each of the plurality of memory banks BK0 to BK7 and BK0' to BK7' may include a plurality of memory blocks. Each of the plurality of memory blocks may include a plurality of memory cells. According to an embodiment, the plurality of memory cells may be non-volatile memory cells.

According to an embodiment, the memory banks BK0 to BK7 and BK0' to BK7' may refer to memory areas included in different memory devices. In another embodiment, the memory banks BK0 to BK7 and BK0' to BK7' may refer to different memory areas that are divided from each other within a single memory device.

According to an embodiment, physically adjacent memory banks may be grouped into memory bank groups. Data that are output from memory banks included in one memory bank group may be finally merged into merged data MDATA.

In the present disclosure, a plurality of memory banks included in one plane may be sequentially arranged according to assigned numbers, and the sequentially arranged memory banks may be adjacent to each other. For example, the plurality of memory banks BK0 to BK7 included in the plane a 1100*a* may be sequentially arranged according to assigned numbers. The memory bank 0 BK0 may be adjacent to the memory bank 1 BK1, the memory bank 1 BK1 may be adjacent to the memory bank 2 BK2, the memory bank 2 BK2 may be adjacent to the memory bank 3 BK3, the memory bank 3 BK3 may be adjacent to the memory bank 4 BK4, the memory bank 4 BK4 may be adjacent to the memory bank 5 BK5, the memory bank 5 BK5 may be adjacent to the memory bank 6 BK6, and the memory bank 6 BK6 may be adjacent to the memory bank 7 BK7.

In the present disclosure, under the assumption that physically adjacent memory banks are sequentially arranged, the arrangement of the memory banks may be determined based only on relative distances between the memory banks. That is, although FIG. 1 illustrates that the compressing circuits 1200 and the merge circuits 1300 are located between respective memory planes in one plane group, a peripheral circuit including compressing circuits 1200 and the merge circuits 1300 may be located in a different plane compared to the memory banks. Thus, when it is determined whether the memory banks are adjacent to each other, the peripheral circuit might not be taken into consideration. For example, the compressing circuits 1200 and the merge circuits 1300 between the memory bank 0 BK0 and the memory bank 0' BK0' may be located in a different plane compared to the memory banks BK0 and BK0'. Thus, the memory bank 0 BK0 and the memory bank 0' BK0' may be determined to be memory banks 1100 that are adjacent to each other when excluding the compressing circuits 1200 and the merge circuits 1300.

FIG. 1 shows the logical distances, not physical distances, between memory banks in different planes. For example, in FIG. 1, although the memory bank 0 BK0 and the memory bank 4 BK4 are not physically adjacent to each other, the memory bank 0 BK0 and the memory bank 4 BK4 are illustrated as being sequentially disposed so as to show that data that are read from the memory bank 0 BK0 and the memory bank 4 BK4 are compressed by the same compressing circuit 1200.

Each of the compressing circuit 1200 may be coupled to at least two memory banks included in the same plane, among the plurality of planes 1100*a* to 1100*d*. Each of the compressing circuits 1200 may compress a plurality of data read from the two or more memory banks to output the compressed data corresponding to the two or more memory banks. For example, the memory bank 0 BK0 and the memory bank 4 BK4 may be simultaneously coupled to the same compressing circuit 1200. The corresponding compressing circuit 1200 may compress a plurality of data that are read from the memory bank 0 BK0 and the memory bank 4 BK4.

According to an embodiment, the compressing circuit 1200 may be activated when the memory device 1000 performs a compression read operation. According to an embodiment, the memory device 1000 may perform a compression read operation based on a command that is received from an external device. In another embodiment, the memory device 1000 may perform a compression read operation based on its own judgment.

During the compression read operation, first, data DATA may be read and output from the memory banks BK0 to BK7 and BK0' to BK7'.

Thereafter, the data DATA that are read from the memory banks BK0 to BK7 and BK0' to BK7' may be compressed by the compressing circuit 1200 coupled thereto. That is, each of the compressing circuits 1200 may compress the data DATA read from at least two memory banks coupled thereto. Therefore, at least two compressed data CDATA may be output from each of the compressing circuits 1200.

The compressing circuit 1200 may generate the compressed data CDATA by compressing the read data DATA at a compression rate of 1:N, where N may be a natural number of 2 or more. For example, when it is assumed that N is 4, the compressing circuit 1200 may generate the compressed data CDATA by compressing data DATA at the compression rate of 1:4, i.e., 25%. For example, when the data DATA is eight bytes, the compressed data CDATA of two bytes may be output from the compressing circuit 1200.

The compressed data CDATA that are output by the compressing circuits 1200 may be merged by the merge circuit 1300. The merge circuit 1300 may merge the plurality of compressed data CDATA corresponding to different memory banks. According to an embodiment, each of the merge circuits 1300 may receive the plurality of compressed data CDATA corresponding to a plurality of memory banks included in any one of the memory bank groups from at least two compressing circuits 1200. Each of the merge circuits 1300 may output the merged data MDATA corresponding to any one of the memory bank groups by merging the plurality of compressed data CDATA.

According to an embodiment, a memory bank group may include a plurality of memory banks included in at least two planes. A memory bank group and operations of outputting merged data corresponding to the memory bank group will be described in more detail with reference to FIGS. 3A and 3B.

According to an embodiment, the merge circuit 1300 may output different data based on whether a compression read operation is activated or not. According to an embodiment, when a compression read operation is activated, the merge circuit 1300 may output the merged data MDATA by merging the compressed data CDATA, the compressed data CDATA being output by compressing the data DATA read from the memory banks BK0 to BK7 and BK0' to BK7'. In another embodiment, when the compression read operation is deactivated, that is, when a normal read operation is performed, the merge circuit 1300 may output the data DATA read from the memory banks BK0 to BK7 and BK0' to BK7'.

The merged data MDATA that are output from the merge circuits 1300 may be provided to the transmission circuit 1400. The transmission circuit 1400 may be coupled to the merge circuits 1300 through a plurality of channels and may activate some of the plurality of channels based on a plane group selection signal indicating a plane group to be selected from among the plane groups. The transmission circuit 1400 may output the data that are input from the merge circuit 1300 through the activated channels.

According to an embodiment, as channels through which the merged data MDATA is transferred are activated, the transmission circuit 1400 may receive the merged data MDATA from the merge circuit and may output the received merged data MDATA without additional merging.

The merged data MDATA that are output from the transmission circuit 1400 may be stored in the output buffer circuit 1500. The merged data MDATA stored in the output buffer circuit 1500 may be output based on an output control signal.

According to an embodiment, the output buffer circuit 1500 may receive the plurality of merged data MDATA corresponding to the plurality of memory bank groups and may output the plurality of merged data MDATA to an external device.

FIG. 2 is a diagram illustrating the compressing circuit 1200 according to an embodiment of the present disclosure.

Referring to FIG. 2, the memory bank 0 BK0 and the memory bank 4 BK4 may be coupled to one compressing circuit 1200. The compressing circuit 1200 that is coupled to the memory bank 0 BK0 and the memory bank 4 BK4 will be described below with reference to FIG. 2. However, the description regarding the compressing circuit 1200 with reference to FIG. 2 is applicable to the compressing circuits 1200 coupled to other memory banks as shown in FIG. 1.

According to an embodiment, the compressing circuit 1200 may include a data compressing circuit 1210 and a data output circuit 1220.

According to an embodiment, the data compressing circuit 1210 may simultaneously compress a plurality of data that are read from at least two memory banks.

For example, the memory bank 0 BK0 and the memory bank 4 BK4 may output data 0 DATA0 and data 4 DATA4 in response to an output control signal 0 CTRL0 and an output control signal 4 CTRL4, respectively. The output control signal 0 CTRL0 and the output control signal 4 CTRL4 may be generated based on a clock signal being supplied. The clock signal may be provided from an external device or from a power supply in the memory device 1000. The data compressing circuit 1210 may receive the data 0 DATA0 from the memory bank 0 BK0 and the data 4 DATA4 from the memory bank 4 BK4. In addition, the data compressing circuit 1210 may receive the output control signal 0 CTRL0 and the output control signal 4 CTRL4 from the memory bank 0 BK0 and the memory bank 4 BK4. The data compressing circuit 1210 may simultaneously compress the data 0 DATA0 and the data 4 DATA4 in response to at least one of the output control signal 0 CTRL0 and the output control signal 4 CTRL4.

According to an embodiment, the data compressing circuit 1210 may simultaneously merge a plurality of data that are read from at least two memory banks and may compress the plurality of merged data.

For example, the data compressing circuit 1210 may merge the data 0 DATA0 and the data 4 DATA4. The data compressing circuit 1210 may compress the merged data in response to at least one of the output control signal 0 CTRL0 and the output control signal 4 CTRL4.

The data output circuit 1220 may receive the compressed data CDATA from the data compressing circuit 1210 and may receive the output control signal 0 CTRL0 and the output control signal 4 CTRL4.

According to an embodiment, the data output circuit 1220 may transfer compressed data corresponding to at least two memory banks to different merge circuits.

For example, although the compressed data CDATA includes compressed data 0 CDATA 0 corresponding to the data 0 DATA0 and compressed data 4 CDATA 4 corresponding to the compressed data 4 CDATA 4, the compressed data 0 CDATA 0 and the compressed data 4 CDATA 4 may be physically separated from each other. Therefore, the compressed data 0 CDATA 0 and the compressed data 4 CDATA 4 may be output through separate paths. More specifically, the data output circuit 1220 may transfer the compressed data 0 CDATA 0 and the compressed data 4 CDATA 4 to different merge circuits in response to at least one of the output control signal 0 CTRL0 and the output control signal 4 CTRL4.

According to an embodiment, at least two memory banks coupled to one compressing circuit 1200 may be included in different memory bank groups. For example, the memory bank 0 BK0 and the memory bank 4 BK4 may be included in different memory bank groups. In other words, the compressed data 0 CDATA 0 and the compressed data 4 CDATA 4 might not be merged together when being transferred to the output buffer circuit. In addition, the memory bank 0 BK0 and the memory bank 4 BK4 might not be physically adjacent to each other.

Figure 3A:
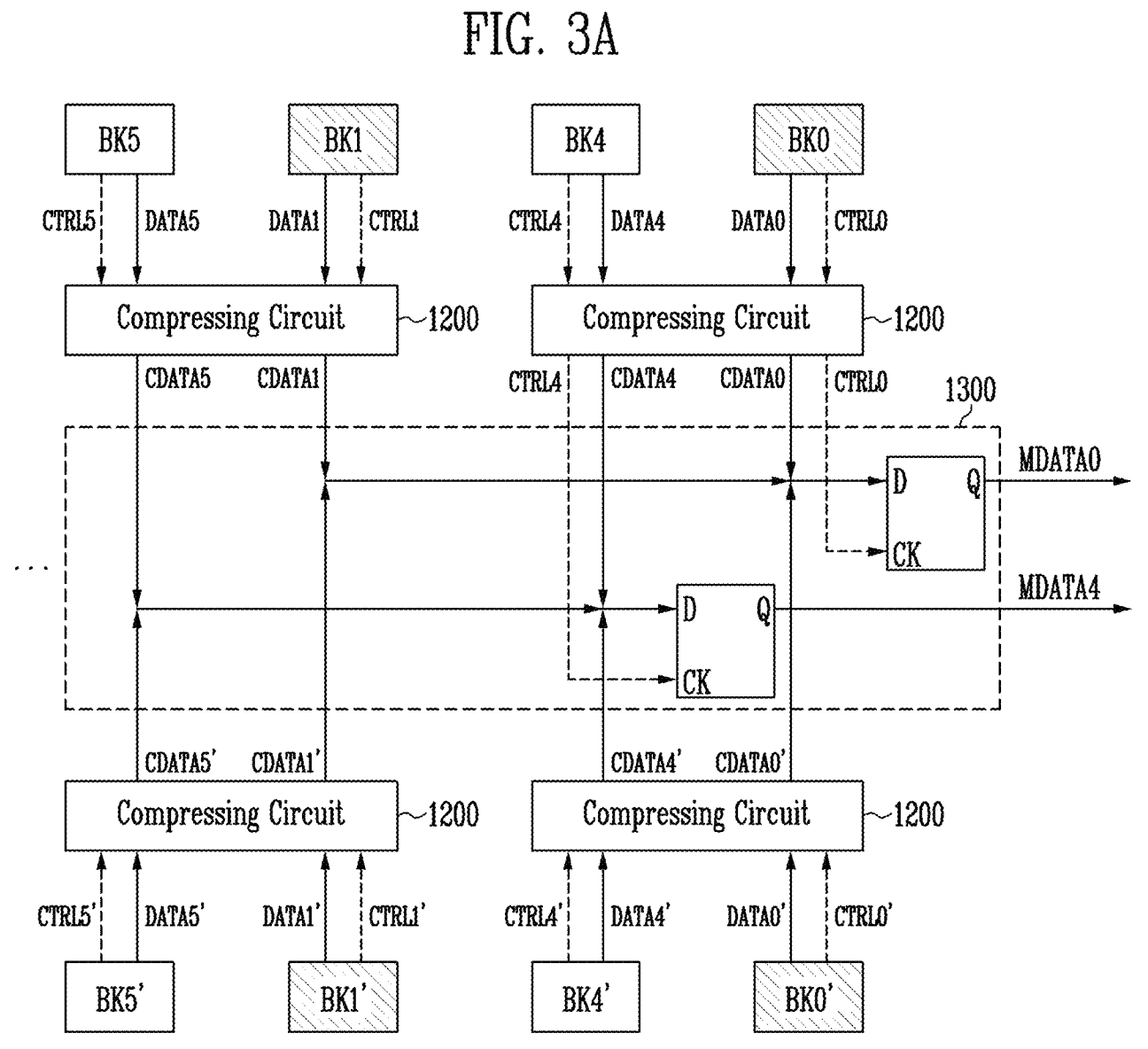

FIGS. 3A and 3B are diagrams illustrating a merging circuit according to an embodiment of the present disclosure.

More specifically, FIG. 3A shows an example in which data DATA0, DATA1, DATA4, DATA5, DATA0', DATA1', DATA4', and DATA5' read from the memory bank 0 BK0, the memory bank 1 BK1, the memory bank 4 BK4, the memory bank 5 BK5, the memory bank 0' BK0', the memory bank 1' BK1', the memory bank 4' BK4', and the memory bank 5' BK5', respectively, among the memory banks included in the plane a 1100*a* and the plane b 1100*b*, are compressed and merged. In addition, FIG. 3B shows an example in which data DATA2, DATA3, DATA6, DATA7, DATA2', DATA3', DATA6', and DATA7' read from the memory bank 2 BK2, the memory bank 3 BK3, the memory bank 6 BK6, the memory bank 7 BK7, the memory bank 2' BK2', the memory bank 3' BK3', the memory bank 6' BK6', and the memory bank 7' BK7', respectively, among the memory banks included in the plane a 1100*a* and the plane b 1100*b*, are compressed and merged.

Referring to FIG. 3A, the memory bank 0 BK0, the memory bank 1 BK1, the memory bank 0' BK0', and the memory bank 1' BK1' may be included in the memory bank group.

According to an embodiment, each of the plurality of memory bank groups may include memory banks that are physically adjacent to each other. That is, the memory bank 0 BK0, the memory bank 1 BK1, the memory bank 0' BK0', and the memory bank 1' BK1' may be physically adjacent to each other.

The compressing circuit 1200 may compress the data 0 DATA0 read from the memory bank 0 BK0 to output compressed data 0 CDATA0. The compressing circuit 1200 may compress the data 1 DATA1 read from the memory bank 1 BK1 to output compressed data 1 CDATA1. The compressing circuit 1200 may compress the data 0' DATA0' read from the memory bank 0' BK0' to output compressed data 0' CDATA0'. The compressing circuit 1200 may compress the data 1' DATA1' read from the memory bank 1' BK1' to output the compressed data 1' CDATA1'.

In addition, the output control signals CTRL0, CTRL1, CTRL0', and CTRL1' may be output together with the data DATA0, DATA1, DATA0', and DATA1' from the memory bank 0 BK0, the memory bank 1 BK1, the memory bank 0' BK0', and the memory bank 1' BK1', respectively.

The plurality of compressed data CDATA0, CDATA1, CDATA0', and CDATA1' may be merged by the merge circuit 1300. According to an embodiment, the merge circuit 1300 may include a D flip-flop. The plurality of compressed data CDATA0, CDATA1, CDATA0', and CDATA1' may be provided as an input to the D flip-flop and may be latched. According to an embodiment, the merge circuit 1300 may include D flip-flops that correspond to the number of bytes of data read from a memory bank. However, the number of D flip-flops is not limited thereto. For example, when it is assumed that eight bytes of data is read from a memory bank, the merge circuit 1300 may include eight D flip-flops. During a normal read operation, the eight bytes of data may be read from the memory bank and may be latched to the eight D flip-flops. When, during a compression read operation, data is compressed at a compression rate of 1:4, i.e., 25%, by the compressing circuit 1200, two bytes of the compressed data 0 CDATA0 output by the memory bank 0 BK0, two bytes of the compressed data 1 CDATA1 output by the memory bank 1 BK1, two bytes of the compressed data 0' CDATA0' output by the memory bank 0' BK0', and two bytes of the compressed data 1' CDATA1' output by the memory bank 1' BK1' may be latched by the eight D flip-flops.

The plurality of compressed data CDATA0, CDATA1, CDATA0', and CDATA1' latched by the D flip-flops may be aligned in response to the output control signal 0 CTRL0 that is input to the D flip-flops so that merged data 0 MDATA0 may be output. FIG. 2 illustrates that the output control signal 0 CTRL0 is used as a clock signal that is input to the D flip-flop. However, the present disclosure is not limited thereto. A clock signal that is input to a D flip-flop may be selected from among the output control signal 0 CTRL0, the output control signal 1 CTRL1, the output control signal 0' CTRL0', and the output control signal 1 CTRL1'. Therefore, according to an embodiment, the merge circuit 1300 may further include a signal selector (not shown) that selects a clock signal that is input to the D flip-flop.

In addition, the memory bank 4 BK4, the memory bank 5 BK5, the memory bank 4' BK4', and the memory bank 5' BK5' may be included in the same memory bank group. That is, the memory bank 4 BK4, the memory bank 5 BK5, the memory bank 4' BK4', and the memory bank 5' BK5' may be physically adjacent to each other.

The data DATA4, DATA5, DATA4', and DATA5' read from the memory bank 4 BK4, the memory bank 5 BK5, the memory bank 4' BK4', the memory bank 5' BK5', respectively, may be compressed by the compressing circuits 1200 coupled thereto. The data DATA4, DATA5, DATA4', and DATA5' may be output from the respective compressing circuits 1200.

In addition, the output control signals CTRL4, CTRL5, CTRL4', and CTRL5' may be output together with the data DATA4, DATA5, DATA4', and DATA5' from the memory bank 4 BK4, the memory bank 5 BK5, the memory bank 4' BK4', and the memory bank 5' BK5', respectively.

The plurality of compressed data CDATA4, CDATA5, CDATA4', and CDATA5' may be merged by the merge circuit 1300. The plurality of compressed data CDATA4, CDATA5, CDATA4', and CDATA5' may be provided as an input to the D flip-flop and may be latched. The plurality of compressed data CDATA4, CDATA5, CDATA4', and CDATA5' latched by the D flip-flop may be aligned in response to the output control signal 4 CTRL4 that is input to the D flip-flop so that merged data 4 MDATA4 may be output.

In other words, the memory bank 0 BK0 and the memory bank 4 BK4 may be coupled to the same compressing circuit 1200, and the data DATA0 and DATA4 of the memory bank 0 BK0 and the memory bank 4 BK4 may be compressed together. However, since the memory bank 0 BK0 and the memory bank 4 BK4 are included in different memory bank groups, the data DATA0 and DATA4 might not be merged together when transferred to the output buffer circuit.

Referring to FIG. 3B, the same compressing and merging methods as described above with reference to FIG. 3A may be applied to the data DATA2, DATA3, DATA6, DATA7, DATA2', DATA3', DATA6', and DATA7' read from the memory bank 2 BK2, the memory bank 3 BK3, the memory bank 6 BK6, the memory bank 7 BK7, the memory bank 2' BK2', the memory bank 3' BK3', the memory bank 6' BK6', and the memory bank 7' BK7', respectively.

For example, the memory bank 2 BK2, the memory bank 3 BK3, the memory bank 2' BK2', and the memory bank 3' BK3' may be included in the same memory bank group. That is, the memory bank 2 BK2, the memory bank 3 BK3, the memory bank 2' BK2', and the memory bank 3' BK3' may be physically adjacent to each other.

The data DATA2, DATA3, DATA2', and DATA3' read from the memory bank 2 BK2, the memory bank 3 BK3, the memory bank 2' BK2', and the memory bank 3' BK3' may be compressed by the compressing circuits 1200 respectively coupled thereto. The plurality of compressed data DATA2, DATA3, DATA2', and DATA3' corresponding to the plurality of data DATA2, DATA3, DATA2', and DATA3' may be merged by the merge circuit 1300 to output merged data 2 MDATA2.

In addition, the memory bank 6 BK6, the memory bank 7 BK7, the memory bank 6' BK6', and the memory bank 7' BK7' may be included in the same memory bank group. That is, the memory bank 6 BK6, the memory bank 7 BK7, the memory bank 6' BK6', and the memory bank 7' BK7' may be physically adjacent to each other.

The data DATA6, DATA7, DATA6', and DATA7' read from the memory bank 6 BK6, the memory bank 7 BK7, the memory bank 6' BK6', the memory bank 7' BK7' may be compressed by the compressing circuits 1200 respectively coupled thereto. The plurality of compressed data CDATA6, CDATA7, CDATA6', and CDATA7' corresponding to the plurality of data DATA6, DATA7, DATA6', and DATA7' may be merged by the merge circuit 1300 to output merged data 6 MDATA6.

Figure 4:
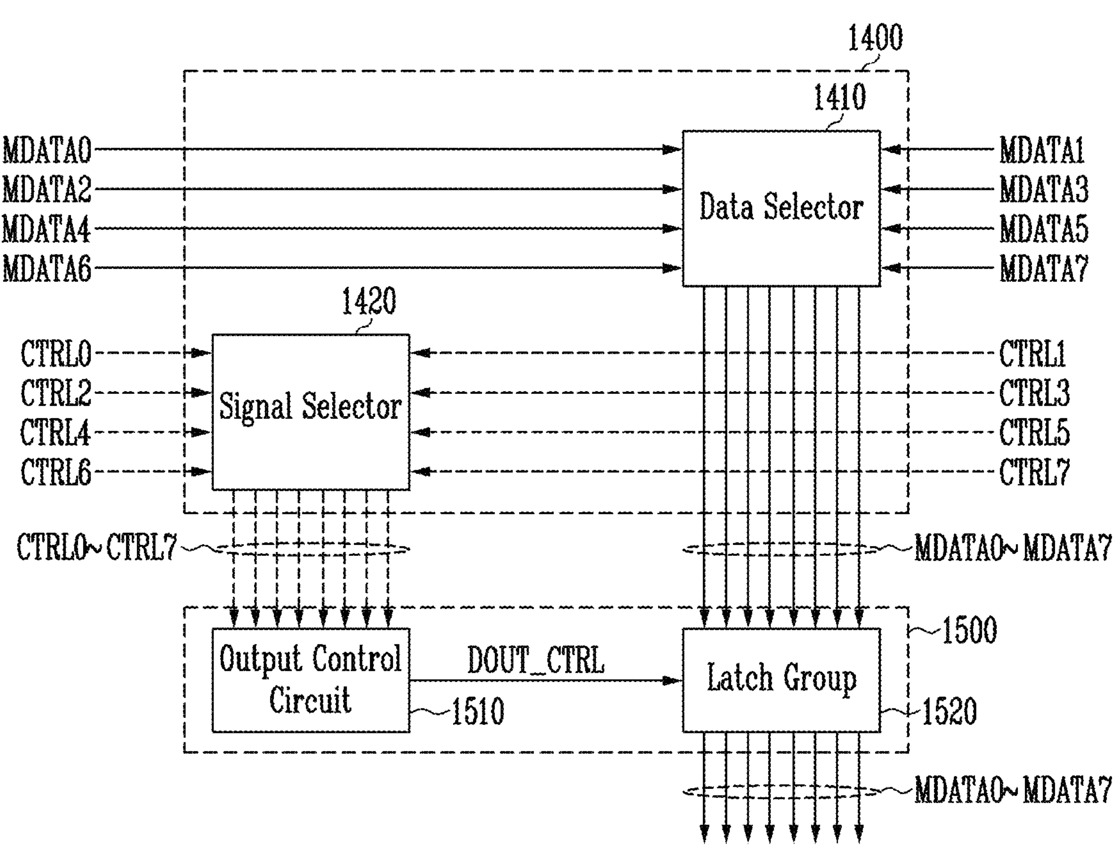
FIG. 4 is a diagram illustrating a transmission circuit and an output buffer circuit according to an embodiment of the present disclosure.

FIG. 4 is a diagram illustrating the transmission circuit 1400 and the output buffer circuit 1500 according to an embodiment of the present disclosure.

Referring to FIGS. 1 and 4, the transmission circuit 1400 may include a data selector 1410 and a signal selector 1420.

The data selector 1410 may receive the merged data MDATA0 to MDATA7 that are output from the plurality of merge circuits 1300. More specifically, the merged data 0 MDATA0, the merged data 2 MDATA2, the merged data 4 MDATA4, and the merged data 6 MDATA6 may correspond to data that are output by compressing and merging data read from the memory banks included in the plane a 1100*a* and the plane b 1100*b* according to the method described above with reference to FIGS. 3A and 3B. The merged data 1 MDATA1, the merged data 3 MDATA3, the merged data 5 MDATA5, and the merged data 7 MDATA7 may correspond to data that are output by compressing and merging data read from the memory banks included in the plane c 1100*c* and the plane d 1100*d* according to the method described above with reference to FIGS. 3A and 3B.

According to an embodiment, the data selector 1410, which may be coupled to the merge circuits 1300 through a plurality of channels, may include one or more data select circuits. The data select circuits may activate some channels based on a plane group selecting signal indicating a plane group to be selected from among plane groups. The data selector 1410 may output the merged data that are input through the activated channels. According to an embodiment, the data selector 1410 may select and activate some of the channels to thereby output received data. The data selector 1410 might not carry out merging the received data.

The signal selector 1420 may receive output the output control signals CTRL0 to CTRL7 that are output from the memory banks 1100. More specifically, the output control signal 0 CTRL0, the output control signal 2 CTRL2, the output control signal 4 CTRL4, and the output control signal 6 CTRL6 may be output from at least some of the memory banks included in the plane a 1100*a* and the plane b 1100*b*. The output control signal 1 CTRL1, the output control signal 3 CTRL3, the output control signal 5 CTRL5, and the output control signal 7 CTRL7 may be output from at least some of the memory banks included in the plane c 1100*c* and the plane d 1100*d*.

The signal selector 1420 may receive the output control signals CTRL0 to CTRL7 generated by the memory banks. According to an embodiment, the signal selector 1420 may further receive other output control signals that are output from the memory banks in addition to the output control signals that are output from the merge circuit 1300.

When the memory device 1000 performs a compression read operation, the signal selector 1420 may select and output at least some of the received output control signals CTRL0 to CTRL7.

According to an embodiment, the signal selector 1420 may select and output the output control signal 0 CTRL0 as an output control signal corresponding to the merged data 0 MDATA0. The signal selector 1420 may output the output control signal 1 CTRL1 as an output control signal corresponding to the merged data 1 MDATA1. The signal selector 1420 may output the output control signal 2 CTRL2 as an output control signal corresponding to the merged data 2 MDATA2. The signal selector 1420 may output the output control signal 3 CTRL3 as an output control signal corresponding to the merged data 3 MDATA3. The signal selector 1420 may output the output control signal 4 CTRL4 as an output control signal corresponding to the merged data 4 MDATA4. The signal selector 1420 may output the output control signal 5 CTRL5 as an output control signal corresponding to the merged data 5 MDATA5. The signal selector 1420 may output the output control signal 6 CTRL6 as an output control signal corresponding to the merged data 6 MDATA6. The signal selector 1420 may output the output control signal 7 CTRL7 as an output control signal corresponding to the merged data 7 MDATA7.

Though not shown in FIG. 4, when the memory device 1000 performs a normal read operation, the signal selector 1420 may receive the output control signal generated from the memory bank from which data is read and may output the received output control signal.

The plurality of merged data MDATA0 to MDATA7 that are output by the data selector 1410 and the plurality of output control signals CTRL0 to CTRL7 selected by the signal selector 1420 may be provided to the output buffer circuit 1500.

The output buffer circuit 1500 may include an output control circuit 1510 and a latch group 1520.

The latch group 1520 may include a plurality of latches. The plurality of merged data MDATA0 to MDATA7 that are output from the transmission circuit 1400 may be latched to the plurality of latches. The output control circuit 1510 may provide a data output control signal DOUT_CTR to the latch group 1520 based on the output control signals CTRL0 to CTRL7 received from the transmission circuit 1400. More specifically, the output control circuit 1510 may provide the data output control signal DOUT_CTR to the data latch group 1520 based on the output control signals CTRL0 to CTRL7 selected by the signal selector 1420. The plurality of merged data MDATA0 to MDATA7 latched to the latch group 1520 may be output in response to the data output control signal DOUT_CTR.

According to an embodiment, the signal selector 1420 may sequentially output the data output control signal DOUT_CTR corresponding to the output control signals CTRL0 to CTRL7 according to a predetermined order. The latch group 1520 may sequentially output the plurality of merged data MDATA0 to MDATA7 to an external device according to the predetermined order.

FIG. 5 is a diagram illustrating a size of a data set that is output from the memory device 1000 according to an embodiment of the present disclosure.

Referring to FIG. 5, one compressing circuit and at least two memory banks coupled thereto may constitute one logical memory bank. For example, the memory bank 0 BK0, the memory bank 4 BK4, and the compressing circuit 1200 may constitute a logical memory bank LBKa0. Each plane may include four logical memory banks. For example, the plane a 1100*a* may include four logical memory banks LBKa0 to LBKa3, the plane b 1100*b* may include four logical memory banks LBKb0 to LBKb3, the plane c 1100*c* may include four logical memory banks LBKc0 to LBKc3, and the plane d 1100*d* may include four logical memory banks LBKd0 to LBKd3.

According to an embodiment, at least two memory banks included in one logical memory bank may have the same column address sequence. A column address sequence may refer to information indicating a column address of data that are output from a memory bank and may include an order assigned to the corresponding column address. For example, the memory bank 0 BK0 and the memory bank 4 BK4 may have the same column address sequence.

In FIG. 5, it may be assumed that eight bytes of data is read from each memory bank. However, this is merely an example. For example, the size of data that are read from each memory bank may be greater or smaller than eight bytes according to each embodiment. In addition, it may be assumed that data is compressed at a compression rate of 1:4, i.e., 25%.

When a compression read command is input from the external device, eight bytes of data may be read from each memory bank.

When the eight bytes of data are read from each memory bank, each logical memory bank may output two compressed data, each having a size of two bytes.

The output compressed data may be merged according to each memory bank group. Since one memory bank group includes four memory banks, eight bytes of merged data may be output per memory bank group.

Since one plane group includes four memory bank groups, four merged data, each having a size of eight bytes, may be output per plane group.

Since the transmission circuit 1400 and the output buffer circuit 1500 receive the plurality of merged data from the two plane groups, the transmission circuit 1400 and the output buffer circuit 1500 may receive eight merged data, each having a size of eight bytes.

As a result, one data set that is output from the output buffer circuit 1500 in response to the compression read command may have a size of 64 bytes.

Figure 6:
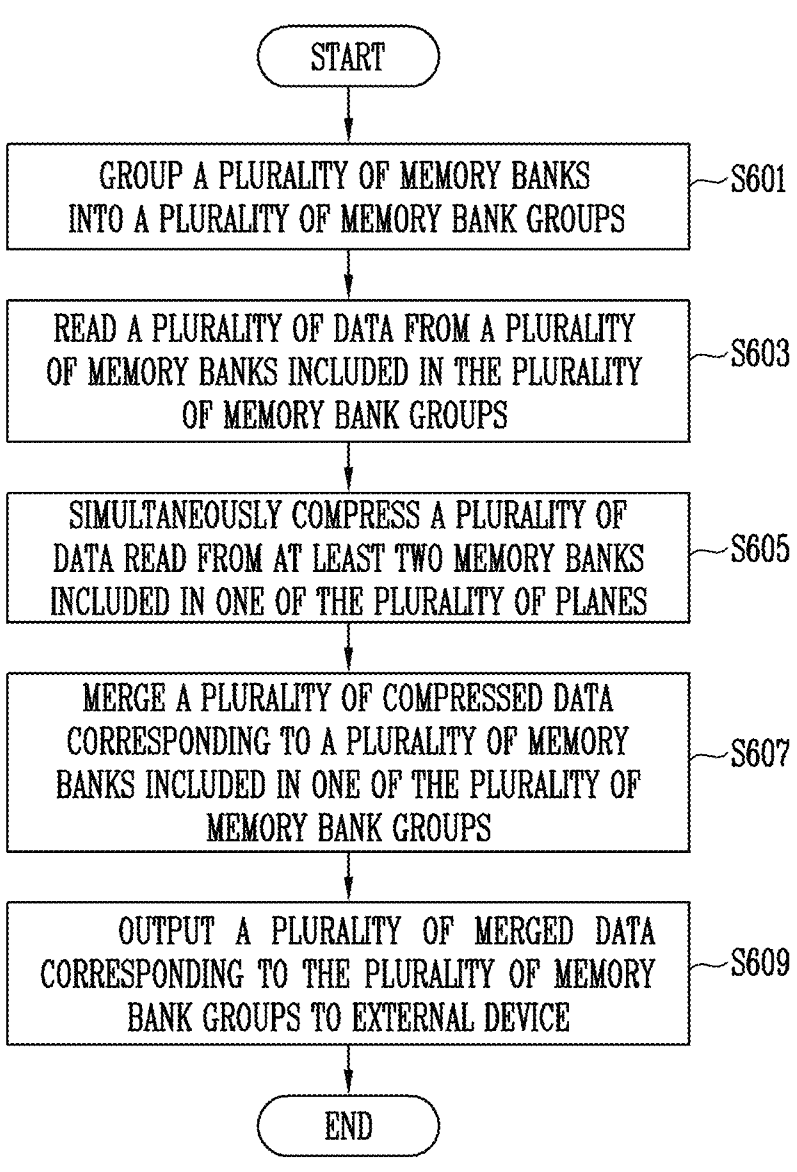
FIG. 6 is a flowchart illustrating a method of operating a memory device according to an embodiment of the present disclosure.

FIG. 6 is a flowchart illustrating a method of operating the memory device 1000 according to an embodiment of the present disclosure.

The method shown in FIG. 6 may be performed by, for example, the memory device 1000 shown in FIG. 1.

At step S601, the memory device 1000 may group a plurality of memory banks into a plurality of memory bank groups. For example, the memory device 1000 may group a plurality of memory banks included in at least two planes, among the plurality of planes, into one memory bank group.

At step S603, the memory device 1000 may read a plurality of data from a plurality of memory banks included in a plurality of memory bank groups.

At step S605, the memory device 1000 may simultaneously compress a plurality of data read from at least two memory banks included in any one of the plurality of planes.

For example, the memory device 1000 may merge a plurality of data read from at least two memory banks. The memory device 1000 may compress the plurality of merged data.

At step S607, the memory device 1000 may merge the plurality of compressed data corresponding to the plurality of memory banks included in any one of the plurality of memory bank groups.

At step S609, the memory device 1000 may output the plurality of merged data corresponding to the plurality of memory bank groups to an external device.

For example, the memory device 1000 may sequentially output the plurality of merged data according to a predetermined order.

Figure 7:
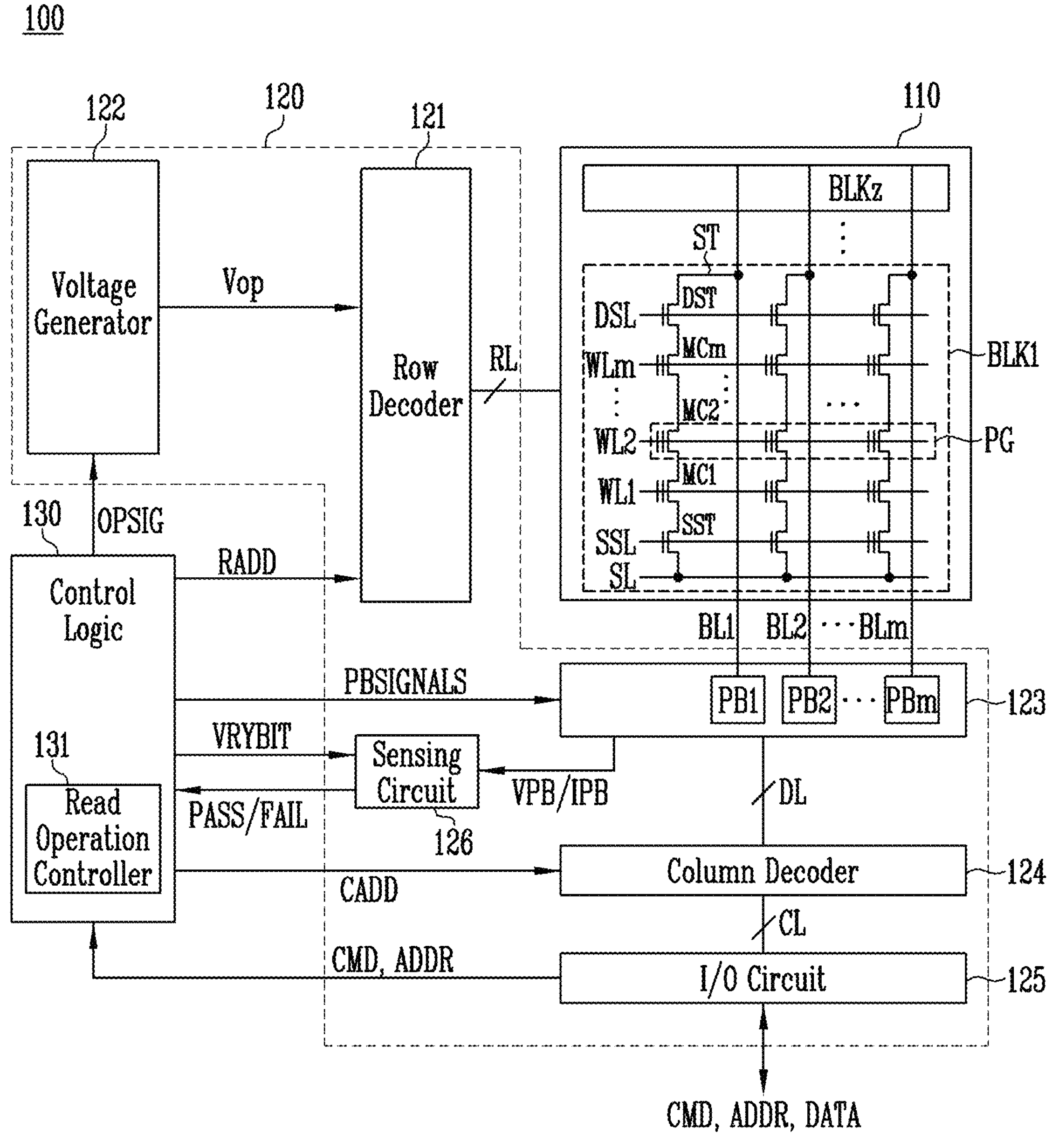
FIG. 7 is a diagram illustrating another example of a memory device according to the present disclosure.

FIG. 7 is a diagram illustrating another example of a memory device according to the present disclosure.

Referring to FIG. 7, a memory device 100 may include a memory cell array 110, a peripheral circuit 120, and a control logic 130.

The memory cell array 110 may include a plurality of memory blocks BLK1 to BLKz.

The plurality of memory blocks BLK1 to BLKz may be coupled to a row decoder 121 through row lines RL. The row lines RL may include at least one source select line SSL, a plurality of word lines WL1 to WLm, and at least one drain select line DSL.

Each of the plurality of memory blocks BLK1 to BLKz may include a plurality of memory cells MC1 to MCm. The plurality of memory cells MC1 to MCm may be coupled to a page buffer group 123 through first to mth bit lines BL1 to BLm. Each of the plurality of memory blocks BLK1 to BLKz may include a plurality of cell strings ST that are coupled between a source line SL and the first to mth bit lines BL1 to BLm. Each of the plurality of cell strings ST may include at least one source select transistor SST, the plurality of first to mth memory cells MC1 to MCm, and at least one drain select transistor DST which are coupled in series between the source line SL and the first to mth bit lines BL1 to BLm.

The memory cell array 110 may include a plurality of memory banks that include a plurality of memory blocks. The memory banks may be the same as those described above with reference to FIG. 1. The memory cell array 110 may include a plurality of planes, and each of the planes may include a plurality of memory banks.

Memory cells coupled to the same word line may be defined as one page PG. Each of the first to mth memory cells MC1 to MCm may include a plurality of data bits.

The peripheral circuit 120 may be configured to perform a program operation, a read operation, or an erase operation on a selected area of the memory cell array 110 in response to the control of the control logic 130.

The peripheral circuit 120 may include the row decoder 121, a voltage generator 122, the page buffer group 123, a column decoder 124, an input/output circuit 125, and a sensing circuit 126.

The row decoder 121 may be configured to decode a row address RADD that is received from the control logic 130. The row decoder 121 may select at least one memory block among the memory blocks BLK1 to BLKz according to the decoded address. In addition, the row decoder 121 may select at least one word line of the selected memory block according to the decoded address. The row decoder 121 may apply operating voltages Vop generated by the voltage generator 122 to the selected word line.

The voltage generator 122 may generate a plurality of voltages by using an external power voltage that is supplied to the memory device 100. More specifically, the voltage generator 122 may generate various operating voltages Vop for program, read, and erase operations in response to an operation signal OPSIG. The generated operating voltages Vop may be supplied to the memory cell array 110 by the row decoder 121.

The page buffer group 123 may include first to mth page buffers PB1 to PBm. In response to page buffer control signals PBSIGNALS, the first to mth page buffers PB1 to PBm may temporarily store data received through the first to mth bit lines BL1 to BLm or may sense voltages or currents in the first to mth bit lines BL1 to BLm during a read or verify operation.

The column decoder 124 may transfer data between the input/output circuit 125 and the page buffer group 123 in response to a column address CADD.

The input/output circuit 125 may transfer a command CMD and an address ADDR from the memory controller to the control logic 130 or may exchange data DATA with the column decoder 124.

The input/output circuit 125 may include a plurality of compressing circuits. The compressing circuits may be coupled to a plurality of page buffers. More specifically, the compressing circuits may be coupled to the page buffers coupled to the memory banks corresponding thereto. The compressing circuits may be the same as the compressing circuits 1200 as described above with reference to FIG. 1. The compressing circuit may compress and output data read from the memory cell array 110 when a compression read operation is performed in response to the control of the control logic 130.

The input/output circuit 125 may include a plurality of merge circuits, a transmission circuit, and an output buffer circuit. Each of the merge circuits may be coupled to at least two compressing circuits. The transmission circuit may be coupled to two or more merge circuits. The merge circuits and the transmission circuit may be the same as the merge circuits 1300 and the transmission circuit 1400 as described above with reference to FIG. 1. Merge circuits may merge and output data that are output from compressing circuits. In addition, a merge circuit may merge compressed data corresponding to memory banks grouped into a memory bank group. A transmission circuit may transfer the data, which are output from merge circuits, to an output buffer circuit. The output buffer circuit may be the same as the output buffer circuit 1500 as described above with reference to FIG. 1.

The sensing circuit 126 may determine whether a verify operation for a predetermined program state passes or not in response to an application of a verify voltage.

For example, during a verify operation, the sensing circuit 126 may generate a reference current in response to an allowable bit signal VRYBIT and may output a pass signal PASS or a fail signal FAIL by comparing a sensing voltage VPB received from the page buffer group 123 with a reference voltage generated by the reference current. In another example, during a verify operation, the sensing circuit 126 may generate a reference voltage in response to the allowable bit signal VRYBIT and may output the pass signal PASS or the fail signal FAIL by comparing a sensing current IPB received from the page buffer group 123 with a reference current generated by the reference voltage.

The control logic 130 may control the peripheral circuit 120 by outputting the operation signal OPSIG, the row address RADD, and the page buffer control signals PBSIGNALS in response to the command CMD and the address ADDR.

According to an embodiment, the control logic 130 may include a read operation controller 131.

The read operation controller may control a read operation of the memory device 100. For example, the read operation controller 131 may provide the voltage generator 122 with the operation signal OPSIG for controlling a read voltage, a read pass voltage, and the like and may generate the row address RADD by decoding the address ADDR of a word line from which data DATA is read.

According to an embodiment, the read operation controller 131 may control the peripheral circuits 120 so that the memory device 100 may operate to perform a normal read operation or a compression read operation.

Figure 8:
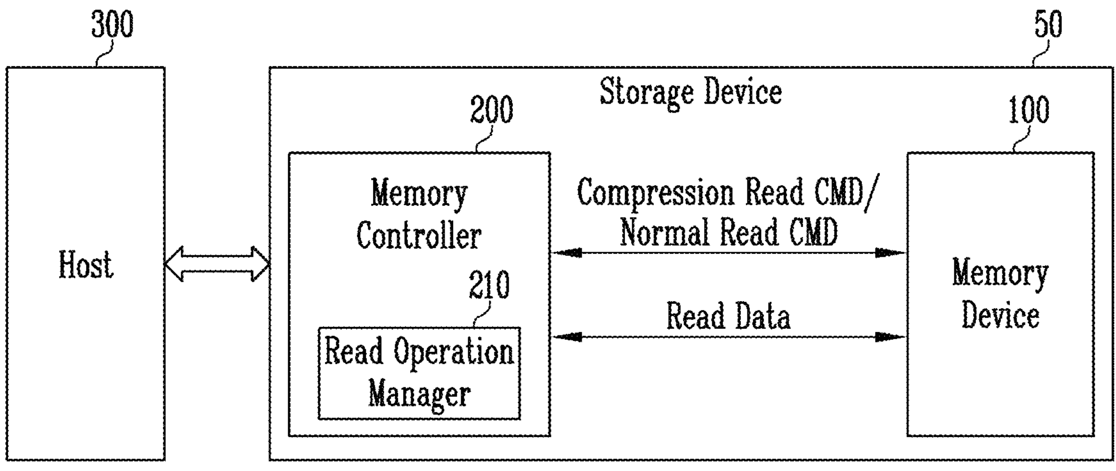
FIG. 8 is a diagram illustrating a storage device according to an embodiment of the present disclosure.

FIG. 8 is a diagram illustrating a storage device 50 according to an embodiment of the present disclosure.

Referring to FIG. 8, the storage device 50 may include the memory device 100 and a memory controller 200 that controls operations of the memory device 100. The storage device 50 may be configured to store data in response to the control of a host 300. Examples of the storage device 50 may include a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface corresponding to a communication method with the host 300. The storage device 50 may be manufactured in any one of various types of packages. For example, the storage device 50 may be manufactured as any one of various kinds of package types, such as package-on-package (POP), system-in-package (SIP), system-on-chip (SOC), multi-chip package (MCP), chip-on-board (COB), wafer-level fabricated package (WFP), and wafer-level stack package (WSP) packages.

The memory device 100 may store data. The memory device 100 may include a plurality of memory cells that store data.

The memory device 100 may include a plurality of planes. Each of the plurality of planes may include a plurality of memory blocks. Each of the memory blocks may include a plurality of memory cells. According to an embodiment, the memory device 100 may be a non-volatile memory.

The memory device 100 may receive a command and an address from the memory controller 200. The memory device 100 may perform the commanded operation on the area selected by the address. For example, the memory device 100 may perform a write operation (or a program operation), a read operation, and an erase operation.

The memory controller 200 may control general operations of the storage device 50.

When power is applied to the storage device 50, the memory controller 200 may execute firmware FW. When the memory device 100 is a flash memory device, the memory device 100 may include a host interface layer HIL that controls communication with the host 300, a flash translation layer FTL that controls communication between the host 300 and the memory device 100, and a flash interface layer FIL that controls communication with the memory device 100.

According to an embodiment, the memory controller 200 may receive data and a logical block address LBA from the host 300 and may translate the logical block address LBA into a physical block address PBA indicating an address of memory cells in which data is to be stored in the memory device 100. In the specification, the logical block address LBA may have the same meaning as a "logical address" or a "logic address." In the specification, the physical block address PBA may have the same meaning as a "physical address" or a "physic address."

The memory controller 200 may control the memory device 100 to perform a write operation, a read operation, or an erase operation in response to the host 300.

According to an embodiment, the memory controller 200 may generate and transfer a command, an address, and data to the memory device 100 regardless of a request from the host 300. For example, the memory controller 200 may provide the memory device 100 with commands, addresses, and data for performing a program operation, a read operation, and erase operations associated with performing wear leveling, read reclaim, and garbage collection.

According to an embodiment, the memory controller 200 may control the memory devices 100 according to an interleaving scheme so as to improve operational performance. According to the above-described interleaving scheme, operations on a plurality of dies may be controlled to overlap each other.

According to an embodiment, the memory controller 200 may include a processor, a memory, an interface, and the like. The processor may execute firmware including various types of information required for the memory controller 200 to operate, codes, or at least one command. The memory may store firmware including various types of information required for the memory controller 200 to operate, codes, or at least one command. The interface may be a component for communication with the memory device 100 and the host 300.

According to an embodiment, the memory controller 200 may include a read operation manager 210. The read operation manager 210 may control the memory device 100 to perform a compression read operation or a normal read operation. For example, the read operation manager 210 may determine whether to perform a compression read operation or a normal read operation and may provide a compression read command or normal read command in response to the determined operation. In response to the received command, the memory device 100 may perform the compression read operation or the normal read operation. When the memory device 100 receives the compression read command, the memory device 100 may provide the memory controller 200 with read data compressed during the compression read operation. The compressed read data may be obtained by compressing data read from a plurality of memory banks and merging the compressed data in units of memory bank groups. When the memory device 100 receives the normal read command, the memory device 100 may provide the memory controller 200 with normal data on which a compression operation is not performed. The normal data may refer to the data read from the memory banks without performing any compression or merging thereon.

According to an embodiment, the compression read operation may be performed in accordance with an efficient soft sensing (ESS) scheme. According to the ESS scheme, data from a plurality of memory areas may be simultaneously compressed and the compressed data may be merged and output together.

The host 300 may communicate with the storage device 1000 by using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a MultiMedia Card (MMC), an embedded MMC (eMMC), a Dual In-line Memory Module (DIMM), a Registered DIMM (RDIMM), and/or a Load Reduced DIMM (LRDIMM).

According to the present disclosure, a memory device having improved compression read performance and a method of operating the same may be provided.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A memory device, comprising:

at least two planes including a plurality of memory bank groups, wherein each of the plurality of memory bank groups includes a plurality of memory banks;

a plurality of compressing circuits, each coupled to at least two memory banks, among the plurality of memory banks, the at least two memory banks being included in the same plane, among the at least two planes, wherein each of the plurality of compressing circuits is configured to compress a plurality of data read from the at least two memory banks to output compressed data respectively corresponding to the at least two memory banks;

at least one merge circuit configured to receive a plurality of compressed data corresponding to a plurality of memory banks included in one memory bank group, among the plurality of memory bank groups, from at least two compressing circuits, among the plurality of compressing circuits, and configured to merge the plurality of compressed data to output merged data corresponding to the one memory bank group; and an output buffer circuit configured to receive a plurality of merged data corresponding to the plurality of memory bank groups from the at least one merge circuit and configured to output the plurality of merged data to an external device, wherein each memory bank, among the at least two memory banks coupled to a corresponding compressing circuit, is included in different memory bank groups, among the plurality of memory bank groups.

2. The memory device of claim 1, wherein the plurality of compressing circuits are configured to simultaneously compress the plurality of data read from the at least two memory banks.

3. The memory device of claim 1, wherein the plurality of compressing circuits are configured to merge the plurality of data read from the at least two memory banks and compress the plurality of merged data.

4. The memory device of claim 1, wherein the at least one merge circuit includes a plurality of merge circuits, and wherein the plurality of compressing circuits are configured to transfer the compressed data respectively corresponding to the at least two memory banks to different merge circuits, among the plurality of merge circuits.

5. The memory device of claim 1, wherein the at least two memory banks are not physically adjacent to each other.

6. The memory device of claim 1, wherein the at least two memory banks have the same column address sequence.

7. The memory device of claim 1, wherein the at least two planes share a peripheral circuit driving a memory cell array included in the at least two planes to perform an operation of the memory device.

8. The memory device of claim 1, wherein each of the plurality of memory bank groups includes physically adjacent memory banks.

9. The memory device of claim 1, wherein each of the plurality of memory bank groups includes four or more memory banks.

10. A method of operating a memory device including a plurality of planes, each including a plurality of memory banks, the method comprising:

grouping the plurality of memory banks into a plurality of memory bank groups;

reading a plurality of data from a plurality of memory banks included in the plurality of memory bank groups;

compressing the plurality of data, wherein a plurality of data read from at least two memory banks, among the plurality of memory banks, included in one of the plurality of planes are simultaneously compressed;

merging a plurality of compressed data corresponding to a plurality of memory banks included in one memory bank group, among the plurality of memory bank groups; and outputting a plurality of merged data corresponding to the plurality of memory bank groups to an external device, wherein each memory bank, among the at least two memory banks, is included in different memory bank groups, among the plurality of memory bank groups.

11. The method of claim 10, wherein the grouping of the plurality of memory banks comprises grouping a plurality of memory banks included in at least two planes, among the plurality of planes, into one memory bank group.

12. The method of claim 10, wherein the compressing of the plurality of data comprises:

merging the plurality of data read from the at least two memory banks; and compressing the plurality of merged data.

13. The method of claim 10, further comprising, after the compressing of the plurality of data, transferring compressed data corresponding to the at least two memory banks to different merge circuits.

14. The method of claim 10, wherein the outputting of the plurality of merged data comprises sequentially outputting the plurality of merged data according to a predetermined order.

15. A memory device, comprising:

a plurality of planes including a plurality of banks;

a first compressing circuit coupled to a first memory bank and a second memory bank, among the plurality of memory banks, wherein the first compressing circuit is configured to compress first data read from the first memory bank and second data read from the second memory bank to output first compressed data and second compressed data corresponding to the first memory bank and the second memory bank, respectively;

a second compressing circuit coupled to a third memory bank and a fourth memory bank, among the plurality of memory banks, wherein the second compressing circuit is configured to compress third data read from the third memory bank and fourth data read from the fourth memory bank to output third compressed data and fourth compressed data corresponding to the third memory bank and the fourth memory bank, respectively;

a first merge circuit configured to generate first merged data by merging the first compressed data and third compressed data;

a second merge circuit configured to generate second merged data by merging the second compressed data and fourth compressed data; and an output buffer circuit configured to output the first merged data and the second merged data to an external device according to a predetermined order.

16. The memory device of claim 15, wherein the compressing circuit is configured to simultaneously compress the first data and the second data.

17. The memory device of claim 15, wherein the compressing circuit is configured to compress the first data and the second data by merging the first and second data.

18. The memory device of claim 15, wherein the first memory bank and the second memory bank are not physically adjacent to each other.

19. The memory device of claim 15, wherein the first memory bank and the second memory bank have the same column address sequence.

* * * * *